United States Patent Office 3,067,585
Patented Dec. 11, 1962

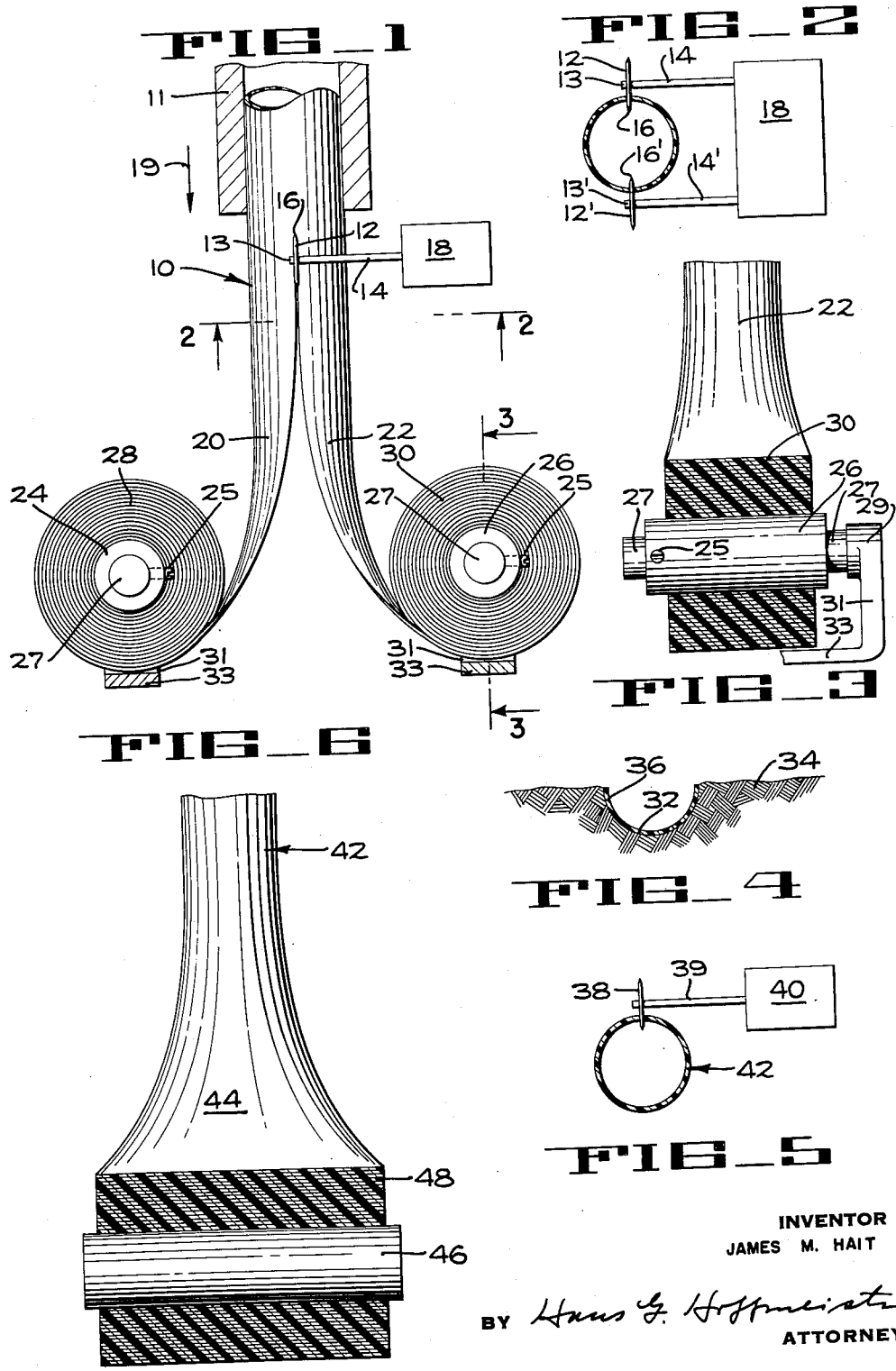

3,067,585
FLUID FLOW CONDUITS
James M. Hait, San Jose, Calif., assignor to FMC
Corporation, a corporation of Delaware
Filed Apr. 20, 1959, Ser. No. 807,438
3 Claims. (Cl. 61—7)

The present invention relates to fluid flow conduits, and more particularly to means for lining open conduits, such as ditches, which have been dug in the earth.

Open conduits dug in the earth have particular use for the conduction of irrigation water. The length of conduit which may be effectively employed is, however, limited by the drop in head which takes place as the irrigation water flows therethrough, such drop resulting primarily from seepage of the water into the earth and secondarily from evaporation of the water.

It is, therefore, an object of the present invention to provide a method of lining open conduits for the prevention of escape therefrom of liquid flowing therethrough.

Another object of the invention is to provide a method of lining open conduits by a continuous operation.

Another object of the present invention is to provide apparatus for lining open conduits, which apparatus is readily transportable and conveniently employed.

Another object of the invention is to provide apparatus for lining open conduits to prevent seepage therefrom of liquid flowing therethrough.

Another object of the invention is to provide a method of manufacturing a device for lining open conduits.

Another object of the present invention is to provide apparatus for the production of a device for lining open conduits.

These and other objects of the invention will become apparent from the following description thereof, read in conjunction with the accompanying drawings, in which:

FIG. 1 is a diagrammatic view, illustrating the manufacture of two rolls of material for lining conduits in accordance with the invention.

FIG. 2 is a section taken along the lines 2—2 of FIG. 1.

FIG. 3 is a section taken along the lines 3—3 of FIG. 1.

FIG. 4 is a transverse section through an irrigation ditch having the lining of the present invention installed therein.

FIG. 5 is a view similar to FIG. 2, illustrating a modified form of the invention.

FIG. 6 is a view similar to FIG. 3, showing a roll of lining material manufactured in accordance with the modification of the invention shown in FIG. 5.

Referring to the drawings, and particularly to FIG. 1, a tube 10 is shown, formed in any suitable manner and being preferably of a plastic material which is waterproof and of good flexibility and high resiliency, such as for example a polyester resin or an epoxy resin. The tube 10 may be of any desired diameter, and the wall thereof should be of such thickness as to have a strong tendency to retain its shape. For example, a tube of 6" diameter might have a wall 1/64" thick, while a tube of 10" diameter might have a wall 1/32" thick. The tube 10 is supported preferably in a generally horizontal position by any suitable means such as a bushing 11.

Apparatus is provided for slitting the tube 10 in half, and includes a set of two knives 12 and 12' (FIG. 2) mounted at the outer ends 13 and 13' of two arms 14 and 14', respectively, and having cutting edges 16 and 16' which engage the wall of tube 10 at diametrically opposed points. The arms 14 and 14' are, at their inner ends, mounted upon drive means 18 of conventional design adapted to rotate said arms and knives. Suitable means (not shown) are provided to effect relative motion between the tube 10 and the knives 12 in a direction axially of the tube. For example, the tube may be continuously advanced through the support bushing 11 in the direction of the arrow 19 past the knives (FIG. 1). The knives 12 and 12' are thus caused to slit the tube 10 into two half sections 20 and 22.

Two rotatable reels 24 and 26 are each removably mounted in any suitable manner, as for example, by a set screw 25, upon a drive shaft 27, and in position for connection thereto of the free ends of the tube half sections 20 and 22, respectively, and for winding thereon of said tube half sections simultaneously with the formation of the latter by the slitting of the tube 10. Each drive shaft 27 is conventionally supported, as by being journalled at one end in a bearing member 29 carried on a support arm 31 upstanding from a base 33. Conventional drive means (not shown) are associated with the drive shafts 27 on which reels 24 and 26 are fixedly mounted for rotating the shafts and the respective reels 24 and 26 during the winding thereon of the tube half sections 20 and 22, said reels and rotation means being designed to apply sufficient force in an axial direction to the tube half sections to flatten them during winding onto the reels.

The tube half sections 20 and 22, when so wound onto the reels 24 and 26, assume the form of two rolls 28 and 30, respectively. As will be seen from FIG. 3 in the case of the roll 30, each of the rolls 28 and 30 is formed of a web of the plastic material which is substantially flat along any line taken through the roll parallel to the axis of the associated reel 24 or 26.

Each roll of plastic material 28 or 30 is designed to provide lining for an open conduit, such as for example an irrigation ditch 32 (FIG. 4) dug in the earth 34. The reel 24 or the reel 26 is adapted upon rotation to permit unwinding of the roll 28 or 30 carried thereby and deposition of the web of plastic material in the ditch 32. Since, as stated above, a plastic material is chosen which has a strong tendency to retain its original tubular shape, the web upon unwinding of the roll 28 or 30 will provide a ditch lining 36 of a semi-circular cross-section, corresponding to that of the tube half section 20 or 22 from which the web was formed.

In operation of the embodiment of the invention of FIGS. 1–4, one end of the tube 10 is first slit a short distance in an axial direction along two diametrically opposed lines by manual or any suitable mechanical means, and the two ends of the tube half sections 20 and 22 thus formed are secured by any convenient method to the reels 24 and 26, respectively, with the half sections placed in engagement with the knives 12 and 12' at the two lines of slitting. Rotation of the reels 24 and 26 and operation of the knife drive means 18 are then initiated, while at the same time relative movement is effected between the tube 10 and knives 12, 12' in a direction axial of the tube. Such relative movement may, for example, be accomplished through action of the reels 24 and 26 in drawing the tube 10 through the support bushing 11 in the direction of the arrow 19 past the knives 12 and 12'; or the movement may be imparted to the tube 10 by the apparatus employed for originally forming said tube. Alternatively, means may be provided for advancing the knives along the tube, the latter being maintained relatively stationary. When desired lengths of webbing have been formed and wound into the rolls 28 and 30, the slitting of the tube 10 and rotation of the reels 24 and 26 are discontinued, and the tube half sections 20 and 22 are transversely slit adjacent the rolls 28 and 30, respectively, any suitable transverse slitting means being employed. The free outer ends of the webs of the rolls are then held in place by any of a number of well known securing means. Set screws 25 are then backed off and the reels 24 and 26 with rolls 28 and 30, respectively, thereon are removed from respective drive shafts 27.

To line the ditch 32, the reel 24 or reel 26 will preferably be rotatably mounted on a tractor or other vehicle, the manner of mounting being such that when the vehicle is driven along the ground and over or alongside the ditch, the webbing carried by the reel will be unwound from the reel and deposited into the ditch. As the webbing is unwound, it will reassume the semicylindrical shape of the original tube half section 20 or 22, and will provide the desired lining 36 for the ditch.

Referring to FIG. 5, a modification of the invention is illustrated, in which only a single knife 38, mounted on an arm 39 and rotated by drive means 40, is employed to slit the plastic tube 42. The single web 44 thus produced is then wound while under an axial stress upon a reel 46 (FIG. 6). The reel 46 and roll 48 wound thereon are employed in the same manner as the reel 24 or 26 and associated roll 28 or 30 of the apparatus of FIGS. 1 to 4. Here, however, when the web is unwound, it will assume substantially the form of the original tube 42.

The lining 36 provided by the apparatus of FIGS. 1-4 will prevent seepage of irrigation water through the wall of the ditch 32, and will thus serve to maintain an adequate flow of the water. The lining formed from the roll 48 of FIG. 6 will, in addition to preventing seepage of water from the conduit lined, further prevent water loss by minimizing evaporation from said conduit.

While particular apparatus of the invention and means for the production thereof have been shown and described, it will be understood that various changes and modifications may be made therein without departing from the spirit of the invention or the scope of the claims appended hereto.

The invention having thus been described, what is claimed as new and for which protection by Letters Patent is desired is:

1. A method of handling a resilient liner for a conduit, comprising the steps of forcefully flattening a normally transversely curved web of resilient conduit lining material, winding the flattened web into a roll, advancing the roll along the conduit and simultaneously unwinding the web and directing the unwound web into the conduit while permitting it to revert to its curved form in contiguity with the walls of the conduit.

2. A method of forming and handling a resilient liner for lining an open conduit comprising the steps of slitting longitudinally a tube of resilient conduit lining material to form a web of curved transverse cross section, flexing the web in a direction for the forceful flattening thereof, winding the flattened web into a roll, advancing the roll along the conduit to be lined and simultaneously unwinding said web and directing the unwound web into the conduit while permitting it to revert to its curved form in contiguity with the walls of the conduit.

3. A method of lining an open conduit by a continuous operation, comprising the steps of advancing along a conduit to be lined a roll of flattened resilient conduit lining material having a tendency to revert to a transversely curved web, simultaneously unwinding the conduit lining material while it is being advanced along the conduit and directing the unwound web into the conduit while permitting the web to revert to its curved form in contiguity with the walls of the conduit.

References Cited in the file of this patent

UNITED STATES PATENTS

| | | |
|---|---|---|
| 1,363,390 | Sullivan | Dec. 28, 1920 |
| 1,474,048 | Lynch | Nov. 13, 1923 |
| 1,820,789 | Farrand | Aug. 25, 1931 |
| 2,151,476 | Kimble et al. | Mar. 21, 1939 |
| 2,157,278 | Blackmore | May 9, 1939 |
| 2,180,858 | Bedell | Nov. 21, 1939 |
| 2,313,860 | Bogue | Mar. 16, 1943 |
| 2,410,420 | Bennett | Nov. 5, 1946 |
| 2,425,123 | Quayle et al. | Aug. 5, 1947 |
| 2,655,262 | Lewis | Oct. 13, 1953 |
| 2,749,565 | Stamm | June 12, 1956 |
| 2,893,655 | Carlson | July 7, 1959 |

FOREIGN PATENTS

| | | |
|---|---|---|
| 813,028 | Great Britain | May 6, 1959 |